US008880079B2

(12) United States Patent
Aoyagi

(10) Patent No.: US 8,880,079 B2
(45) Date of Patent: Nov. 4, 2014

(54) MOBILE COMMUNICATION METHOD, FEMTOCELL RADIO BASE STATION, AND NETWORK APPARATUS

(71) Applicant: NTT Docomo, Inc., Chiyoda-ku (JP)

(72) Inventor: Kenichiro Aoyagi, Tokyo (JP)

(73) Assignee: NTT Docomo, Inc., Chiyoda-ku (JP)

( * ) Notice: Subject to any disclaimer, the term of this patent is extended or adjusted under 35 U.S.C. 154(b) by 0 days.

(21) Appl. No.: 13/887,179

(22) Filed: May 3, 2013

(65) Prior Publication Data
US 2013/0244667 A1 Sep. 19, 2013

Related U.S. Application Data

(63) Continuation of application No. 12/995,022, filed as application No. PCT/JP2009/059875 on May 29, 2009, now Pat. No. 8,457,641.

(30) Foreign Application Priority Data

May 29, 2008 (JP) ................................. 2008-141758

(51) Int. Cl.
*H04W 36/00* (2009.01)
*H04W 36/04* (2009.01)
*H04W 84/04* (2009.01)
*H04W 48/10* (2009.01)

(52) U.S. Cl.
CPC ........ *H04W 36/0005* (2013.01); *H04W 84/045* (2013.01); *H04W 36/0055* (2013.01); *H04W 36/04* (2013.01); *H04W 48/10* (2013.01)
USPC ............ 455/444; 455/443; 455/437; 370/331

(58) Field of Classification Search
CPC ..... H04W 36/04; H04W 36/30; H04W 36/18; H04W 80/04
USPC ............................ 455/444, 443, 437; 370/331
See application file for complete search history.

(56) References Cited

U.S. PATENT DOCUMENTS

| 5,212,805 | A | * | 5/1993 | Comroe et al. ............... 455/520 |
| 6,035,208 | A | | 3/2000 | Osawa |
| 6,671,267 | B1 | * | 12/2003 | Yano et al. ..................... 370/342 |
| 8,359,023 | B2 | * | 1/2013 | Joko et al. .................. 455/422.1 |
| 2002/0013156 | A1 | * | 1/2002 | Yamamoto et al. ........... 455/522 |

(Continued)

FOREIGN PATENT DOCUMENTS

| CN | 1794865 A | 6/2006 |
| JP | 2004 015413 | 1/2004 |

(Continued)

OTHER PUBLICATIONS

Office Action issued on Oct. 25, 2013 in the corresponding Chinese Patent Application No. 200980119705.2 (with English Translation).

(Continued)

*Primary Examiner* — Danh Le
(74) *Attorney, Agent, or Firm* — Oblon, Spivak, McClelland, Maier & Neustadt, L.L.P.

(57) ABSTRACT

The disclosed mobile communication method is a mobile communication method in a mobile communication system, wherein at least a part of a macro-cell (#A), with which first broadcast information is transmitted at a first frequency, and a femto cell (#a), in which second broadcast information is transmitted at a second frequency, overlap geographically. The method has step in which a wireless base station (#a) for a femto cell that manages the femto cell (#a) detects the first broadcast information, step in which the wireless base station (#a) for a femto cell transmits guiding broadcast information at a first frequency in response to detection of the first broadcast information, and step (C) in which a mobile station (UE #1) that is communicating in the macro-cell (#A) performs handover to the femto cell (#a) when the guiding broadcast information is detected.

6 Claims, 6 Drawing Sheets

(56) References Cited

U.S. PATENT DOCUMENTS

| | | |
|---|---|---|
| 2004/0072581 A1 | 4/2004 | Tajima et al. |
| 2006/0166677 A1* | 7/2006 | Derakshan et al. ........... 455/453 |
| 2007/0097938 A1 | 5/2007 | Nylander et al. |
| 2007/0183427 A1 | 8/2007 | Nylander et al. |
| 2008/0102877 A1 | 5/2008 | Suemitsu et al. |
| 2011/0014920 A1 | 1/2011 | Nylander et al. |

FOREIGN PATENT DOCUMENTS

| | | |
|---|---|---|
| JP | 2004-140459 | 5/2004 |
| JP | 2006 324831 | 11/2006 |
| WO | 2006 117838 | 11/2006 |
| WO | 2007 040449 | 4/2007 |
| WO | 2007 040454 | 4/2007 |

OTHER PUBLICATIONS

International Search Report issued Aug. 25, 2009 in PCT/JP09/059875 filed May 29, 2009.

Japanese Office Action issued Jun. 12, 2012, in Japanese Patent Application No. 2010-514554 (with English translation).

* cited by examiner

| PILOT CELL ID | HANDOVER DESTINATION CELL ID |
|---|---|
| #a1, #a3 | #a2 |
| ⋮ | ⋮ |

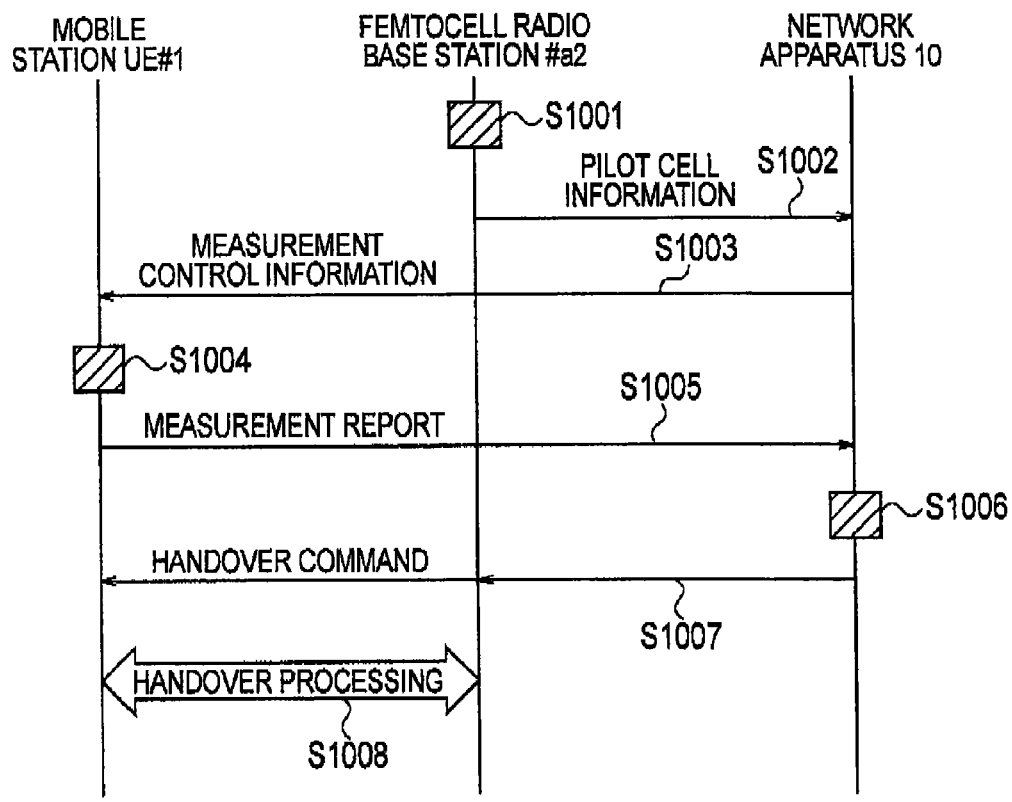

US 8,880,079 B2

MOBILE COMMUNICATION METHOD, FEMTOCELL RADIO BASE STATION, AND NETWORK APPARATUS

CROSS-REFERENCE TO RELATED APPLICATIONS

This application is a continuation of and is based upon and claims the benefit of priority under 35 U.S.C. §120 for U.S. Ser. No. 12/995,022, filed Feb. 22, 2011 the entire contents of which is incorporated herein by reference which is the national state of PCT/JP2009/059875 filed May 29, 2009, and claims the benefit of priority under 35 U.S.C. §119 from Japanese Patent Application No. 2008-141758, filed May 29, 2008.

TECHNICAL FIELD

The present invention relates to a mobile communication method, a femtocell radio base station, and a network apparatus in a mobile communication system in which a macro cell where first broadcast information is transmitted using a first frequency geographically overlaps at least partially with a femtocell where second broadcast information is transmitted using a second frequency.

BACKGROUND ART

For a mobile communication system, there is a scheme using a "pilot cell" as a scheme for performing a handover.

For example, a mobile communication system of a WCDMA scheme is configured as follows. Specifically, in a handover procedure of a "Pilot Carrier Scheme," a mobile station is caused to measure the communication quality of a pilot cell as the communication quality of a cell that is a target of measurement and report. If the measurement result of the communication quality of the pilot cell is reported through a Measurement Report message, the mobile station is caused to perform a handover to a cell using a different frequency.

In such a mobile communication system, a mobile communications carrier installs a pilot cell in an area in which a cell with a specific frequency is not installed, thereby achieving seamless communications.

DISCLOSURE OF THE INVENTION

Problem to be Solved by the Invention

A conventional mobile communication system of the WCDMA scheme employing a handover procedure of the "Pilot Carrier Scheme" is configured in such a way that a mobile communications carrier sets a pilot cell.

However, a radio base station called "a femtocell radio base station (Femto BTS)" installed in a small area such as a home is intended to be set by a user him/herself. Therefore, the number of the femtocell radio base stations to be installed is expected to be so large that a problem may occur that the mobile communications carrier has to make a large amount of operations for setting the pilot cells.

The present invention is made in view of the above problem and an objective thereof is to provide a mobile communication method, a femtocell radio base station, and a network apparatus which are capable of automatically setting a pilot cell in a femtocell.

Means for Solving the Problem

A mobile communication method of a first aspect is used in a mobile communication system in which a macro cell where first broadcast information is transmitted using a first frequency geographically overlaps at least partially with a femtocell where second broadcast information is transmitted using a second frequency. The method includes: step A of detecting the first broadcast information by a femtocell radio base station that manages the femtocell; step B of, in response to the detection of the first broadcast information, transmitting guiding broadcast information by the femtocell radio base station using the first frequency in a pilot cell that geographically overlaps with the femtocell; and step C of performing a handover to the femtocell by a mobile station communicating in the macro cell, when the mobile station detects the guiding broadcast information.

In the first aspect, the step C includes: step C1 of transmitting, by the mobile station, a measurement report including reception power of the guiding broadcast information; step C2 of transmitting a handover command to the mobile station in accordance with the measurement report, the handover command instructing the mobile station to perform the handover to the femtocell; and step C3 of performing the handover to the femtocell by the mobile station in accordance with the handover command.

In the first aspect, in the step C2, the handover command instructing the mobile station to perform the handover to the femtocell is transmitted to the mobile station when the mobile station is determined to be permitted to access the femtocell on the basis of the measurement report.

In the first aspect, the mobile communication method further includes step of determining, by the femtocell radio base station, to transmit the second broadcast information in the femtocell by using the second frequency on the basis of broadcast information transmitted in a neighboring cell.

A femtocell radio base station of a second aspect manages a femtocell in a mobile communication system in which a macro cell where first broadcast information is transmitted using a first frequency geographically overlaps at least partially with the femtocell where second broadcast information is transmitted using a second frequency. The femtocell radio base station includes: a detecting unit configured to detect the first broadcast information; and a setting unit configured to, in response to the detection of the first broadcast information, transmit guiding broadcast information by using the first frequency in a pilot cell geographically overlapping with the femtocell.

In the second aspect, the femtocell radio base station further includes a determining unit configured to determine, on the basis of broadcast information transmitted in a neighboring cell, to transmit the second broadcast information in the femtocell by using the second frequency.

In the second aspect, the femtocell radio base station further includes a handover processing unit configured to transmit, to a mobile station communicating in the macro cell, a handover command instructing the mobile station to perform a handover to the femtocell when a measurement report transmitted from the mobile station includes reception power of the guiding broadcast information.

In the second aspect, the handover processing unit is configured to transmit, to the mobile station, the handover command instructing the mobile station to perform the handover to the femtocell in a case where the measurement report includes the reception power of the guiding broadcast information and where the mobile station is determined to be permitted to access the femtocell.

A network apparatus of third aspect is used in a mobile communication system in which a macro cell where first broadcast information is transmitted using a first frequency geographically overlaps at least partially with a femtocell where second broadcast information is transmitted using a second frequency. The network apparatus includes: a managing unit configured to store the femtocell and a pilot cell, which geographically overlaps the femtocell, in association with each other; and a handover processing unit configured to transmit, to a mobile station communicating in the macro cell, a handover command instructing the mobile station to perform a handover to the femtocell associated with the pilot cell when a measurement report transmitted from the mobile station includes reception power of guiding broadcast information transmitted in the pilot cell by using the first frequency.

In the third aspect, the handover processing unit is configured to transmit, to the mobile station, the handover command instructing the mobile station to perform the handover to the femtocell in a case where the measurement report includes the reception power of the guiding broadcast information and where the mobile station is determined to be permitted to access the femtocell.

Effect of the Invention

As described above, according to the present invention, provided are a mobile communication method, a femtocell radio base station, and a network apparatus which are capable of automatically setting a pilot cell in a femtocell.

BRIEF DESCRIPTION OF THE DRAWINGS

FIG. 6 is a diagram showing an example of access information managed by the network apparatus according to the first embodiment of the present invention.

FIG. 7 is a sequence diagram showing an operation of the mobile communication system according to the first embodiment of the present invention.

EMBODIMENTS FOR CARRYING OUT THE INVENTION

Configuration of Mobile Communication System According to First Embodiment of the Present Invention A configuration of a mobile communication system according to a first embodiment of the present invention is described with reference to FIGS. 1 through 6.

Figure 1:
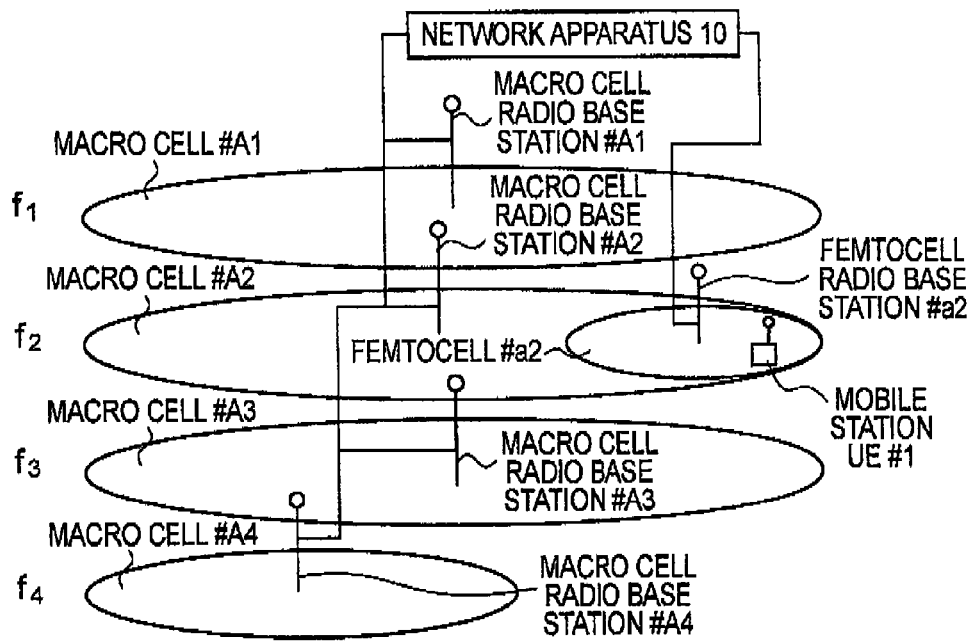
FIG. 1 is an overall configuration diagram of a mobile communication system according to a first embodiment of the present invention.

As shown in FIG. 1, the mobile communication system according to this embodiment includes a network apparatus 10, macro cell radio base stations #A1 to #A4 respectively managing macro cells #A1 to #A4, and a femtocell radio base station #a2 managing a femtocell #a2.

In the mobile communication system, the macro cells #A1 to #A4 at least partially overlap with each other geographically. The femtocell #a2 geographically overlaps with the macro cells #A1 to #A3.

Moreover, in the mobile communication system, broadcast information (first broadcast information, a pilot signal) is transmitted using a first frequency f1 in the macro cell #A1, broadcast information (a pilot signal) is transmitted using a second frequency f2 in the macro cell #A2, broadcast information (a pilot signal) is transmitted using a third frequency f3 in the macro cell #A3, broadcast information (a pilot signal) is transmitted using a fourth frequency f4 in the macro cell #A4, and broadcast information (second broadcast information, a pilot signal) is transmitted using the second frequency f2 in the femtocell #a2.

In the macro cells #A1 to #A4, scrambling codes different from each other may be used or the same scrambling code may be used.

Meanwhile, a scrambling code different from the one used in each macro cells #A1 to #A4 is used in the femtocell #a2.

Figure 2:
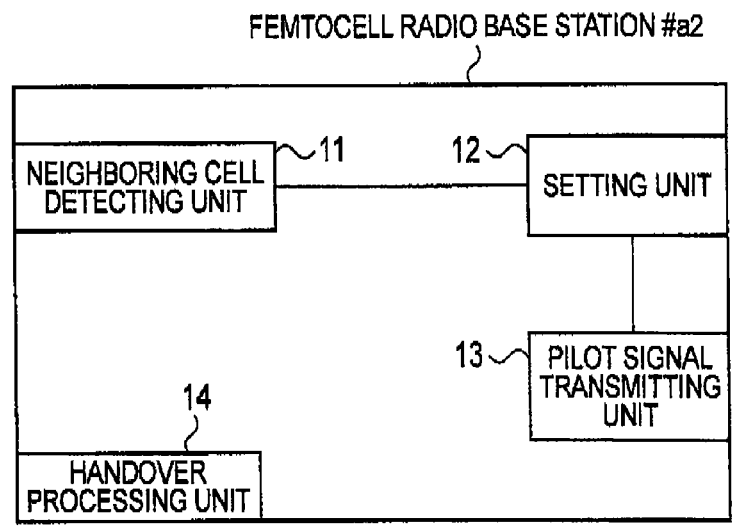
FIG. 2 is a functional block diagram of a femtocell radio base station according to the first embodiment of the present invention.

As shown in FIG. 2, the femtocell radio base station #a2 includes a neighboring cell detecting unit 11, a setting unit 12, a pilot signal transmitting unit 13, a handover processing unit 14, and an access information acquiring unit 15.

The neighboring cell detecting unit 11 is configured to detect broadcast information transmitted in a neighboring cell.

In the example shown in FIG. 1, the neighboring cell detecting unit 11 is configured to detect the broadcast information transmitted using the first frequency f1 in the macro cell #A1, the broadcast information transmitted using the second frequency f2 in the macro cell #A2, and the broadcast information transmitted using the third frequency f3 in the macro cell #A3.

The setting unit 12 is configured to determine that the broadcast information (second broadcast information) is to be transmitted by using the second frequency f2 in the femtocell #a2 on the basis of the broadcast information detected by the neighboring cell detecting unit 1.

In other words, the setting unit 12 determines the frequency to be used in the femtocell #a2 on the basis of a frequency used in a neighboring macro cell when the femtocell radio base station #a2 is installed.

Figure 3:
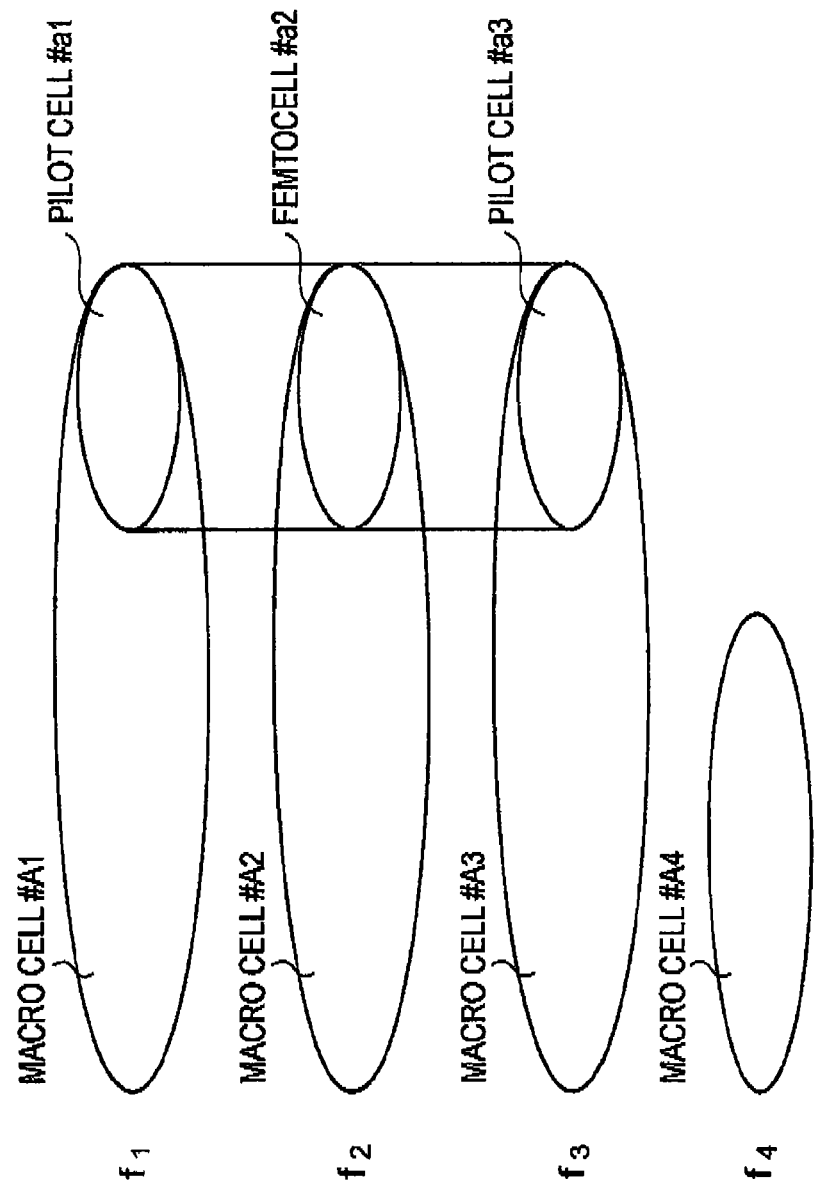
FIG. 3 is a diagram showing an example of a pilot cell set by the femtocell radio base station according to the first embodiment of the present invention.

Furthermore, as shown in FIG. 3, the setting unit 12 is configured to automatically set pilot cells (Home Pilot Carriers) #a1 and #a3 in each of which guiding broadcast information is transmitted using the first frequency f1 or the third frequency f3 in accordance with the broadcast information detected by the neighboring cell detecting unit 1.

As shown in FIG. 3, the setting unit 12 sets no pilot cell in the macro cell #A4 because no broadcast information has been detected therein.

Instead, the setting unit 12 may be configured to assign a permission to access the set pilot cells #a1 and #a3 to a mobile station UE #1 that has a permission to access the femtocell #a2. As a consequence, the mobile station UE #1 that can access the femtocell #a2 is automatically permitted to access the pilot cells #a1 and #a3.

Here, the femtocell #a2 and the pilot cells #a1 and #a3 set by the femtocell radio base station #a2 are collectively referred to as a "home area."

The pilot signal transmitting unit 13 is configured to transmit the guiding broadcast information (pilot signal) by using the first frequency f1 and the third frequency f3 in the respective pilot cells #a1 and #a3 set by the setting unit 12.

The pilot signal transmitting unit 13 is also configured to transmit the second broadcast information (pilot signal) by using the second frequency f2 in the femto cell #a2 set by the setting unit 12.

The handover processing unit 14 is configured to perform handover processing for the mobile station UE #1.

Figures 4, 5:
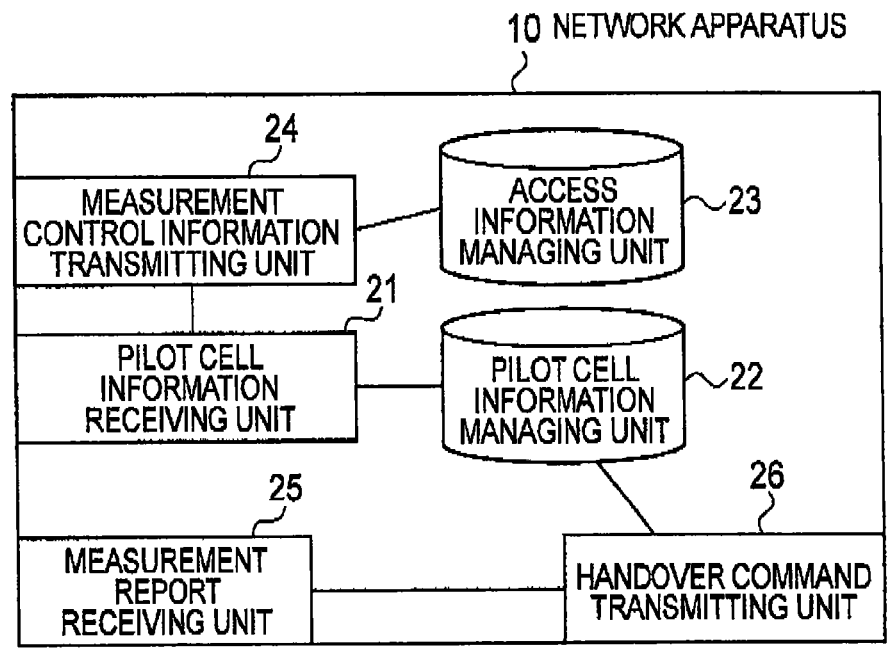
FIG. 4 is a functional block diagram of a network apparatus according to the first embodiment of the present invention.
FIG. 5 is a diagram showing an example of pilot information managed by the network apparatus according to the first embodiment of the present invention.

As illustrated in FIG. 4, the network apparatus 10 includes a pilot cell information receiving unit 21, a pilot cell information managing unit 22, an access information managing unit 23, a measurement control information transmitting unit 24, a measurement report receiving unit 25, and a handover command transmitting unit 26.

For example, the functions of the network apparatus 10 may be provided in a radio control apparatus RNC or may be provided in a core network apparatus (for example, an exchange MSC/SGSN).

The pilot cell information receiving unit 21 is configured to receive information (pilot information) related to a pilot cell set by the femtocell radio base station #a2.

The pilot cell information managing unit 22 is configured to associate a femtocell with a pilot cell that geographically overlaps with the femtocell and store the femtocell and the pilot cell therein. For example, the pilot cell information managing unit 22 is configured to associate a "pilot cell ID" with a "handover destination cell ID (i.e., femtocell ID)."

The access information managing unit 23 is configured to manage information (access information) specifying a mobile station which is permitted to access a femtocell radio base station (or a femtocell).

For example, the access information managing unit 23 is configured to associate a "radio base station ID (femto radio base station ID)" with an "access permitted mobile station ID" as shown in FIG. 6.

The access information managing unit 23 may be provided in the core network apparatus even when the functions of the network apparatus 10 are installed in the radio control apparatus RNC.

The measurement control information transmitting unit 24 is configured to transmit measurement control information (Measurement Control) to a mobile station which is to start communications in a macro cell with reference to the pilot cell information managing unit 22 and the access information managing unit 23.

For example, the measurement control information transmitting unit 24 is configured to transmit the measurement control information to the mobile station UE #1 that is permitted to access the femtocell #a2 when the mobile station UE #1 is to start communications in the macro cell #A1, the measurement control information instructing the mobile station UE #1 to measure the communication quality (reception power of guiding broadcast information, and the like) of the pilot cell #a1 and to report the measurement result.

The measurement report receiving unit 25 is configured to receive a Measurement Report transmitted from a mobile station.

The handover instruction transmitting unit 26 is configured to transmit Handover Command and the like to a mobile station communicating in a cell (for example, a macro cell, a femtocell, or the like) under the control of the network apparatus 10.

Specifically, the handover command transmitting unit 26 is configured to transmit, to the mobile station UE #1 communicating in the macro cell #A1, the handover command instructing the mobile station UE #1 to perform a handover to the femtocell #a2 associated with the pilot cell #a1 when the measurement report transmitted from the mobile station UE #1 includes the reception power of guiding broadcast information transmitted in the pilot cell #a1 using the first frequency f1.

Alternatively, the handover instruction transmitting unit 26 may be configured to transmit to the mobile station UE #1 the handover command instructing the mobile station UE #1 to perform the handover to the femtocell #a2 when the measurement report includes the reception power of guiding broadcast information and the mobile station UE #1 is determined to have been permitted to access the femtocell #a2.

Operation of Mobile Communication System According to First Embodiment of the Present Invention An operation of the mobile communication system according to the first embodiment of the present invention is described with reference to FIG. 7.

As shown in FIG. 7, in Step S1001, once being installed, the femtocell radio base station #a2 detects a frequency used in a neighboring macro cell, determines the frequency f2 to be used in the femtocell #a2, and sets the pilot cells #a1 and #a3.

In Step S1002, the femtocell radio base station #a2 transmits to the network apparatus 10 pilot information to notify the network apparatus 10 of the pilot cells #a1 and #a3 that the femto cell radio base station #a2 sets.

In Step S1003, the network apparatus 10 transmits measurement control information to the mobile station UE #1 that is to start communications in the macro cell #A1 or to the mobile station UE #1 that is communicating in the macro cell #A1, the measurement control information instructing the mobile station UE #1 to set the pilot cells #a1 and #a3 as measurement targets.

In Step S1004, the mobile station UE #1 measures the communication qualities (reception power of the guiding broadcast information, and the like) of the pilot cells #a1 and #a3. In Step S1005, the mobile station UE #1 transmits the measurement report including the measurement result to the network apparatus 10.

In Step S1006, the network apparatus 10 determines that the mobile station UE #1 should perform a handover to the femtocell #a2 associated with the pilot cell #a1. In Step S1007, the network apparatus 10 transmits to the mobile station UE #1 the handover command instructing the mobile station UE #1 to perform the handover.

In Step S1008, the mobile station UE #1 performs the handover to the femtocell #a2.

Advantageous Effect of Mobile Communication System According to First Embodiment of the Present Invention In the mobile communication system according to the first embodiment of the present invention, the mobile station UE #1 that has the permission to access the femtocell radio base station #a2 can perform the handover to the femtocell #a2 by the Pilot Carrier scheme handover when the mobile station UE #1 uses either of the frequencies f1 and f3 used in the respective macro cells #A1 and #A3 and detects the guiding broadcast information in the corresponding one of the macro cells #A1 and #A3 around the home area. Thus, the mobile station UE #1 can be guided to the femtocell #a2.

Furthermore, in the mobile communication system according to the first embodiment of the present invention, a mobile station UE can perform a handover to a cell using a different frequency by using a measurement report of the same frequency without involving measurement of the different frequency by the mobile station UE. Thus, even a mobile station UE including, for example, no "Compressed Mode" function can be guided to the femtocell #a2.

Furthermore, in the mobile communication system according to the first embodiment of the present invention, whether or not the mobile station UE #1 measures the communication quality of the pilot cell #a1 is controlled. Thus, a non-registered mobile station can be prohibited from accessing the femtocell radio base station #a2 and only a registered mobile station is permitted to access the femtocell radio base station #a2.

First Modification

In the above embodiment, the description is given on the mobile communication system of the W-CDMA scheme as an example. The present invention, however, is not limited to such a mobile communication system and is also applicable to a mobile communication system of an LTE (Long Term Evolution) scheme, for example.

In such a case, the functions of the radio control apparatus RNC is installed in the femtocell radio base station #a2 or in the core network apparatus. A mobile communication system according to this modification is described below with reference to FIGS. 8 and 9 while focusing on the differences from the above described mobile communication system according to the first embodiment.

Figure 8:
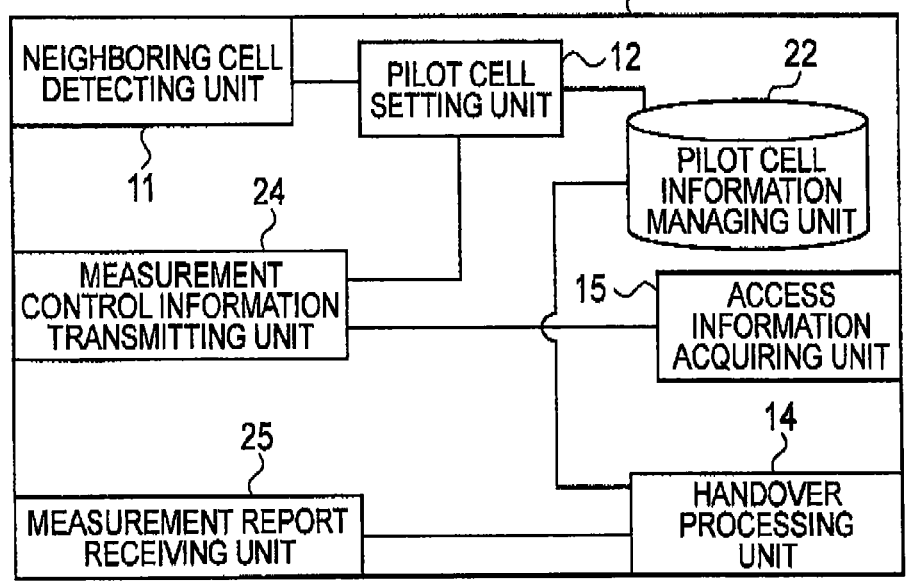
FIG. 8 is a functional block diagram of a femtocell radio base station according to a modification example of the present invention.

As shown in FIG. 8, a femtocell radio base station #a2 according to the present modification includes a neighboring cell detecting unit 11, a setting unit 12, a pilot signal transmitting unit 13, a handover processing unit 14, an access information acquiring unit 15, a pilot cell information managing unit 22, a measurement control information transmitting unit 24, and a measurement report receiving unit 25.

The access information acquiring unit 15 is configured to acquire the above described access information from the network apparatus 10 (for example, an exchange MME serving as the core network apparatus, and the like). The femtocell radio base station #a2 may also be configured to include an access information managing unit 23 in place of the access information acquiring unit 15.

An operation of the mobile communication system according to this modification is described with reference to FIG. 9.

Figure 9:
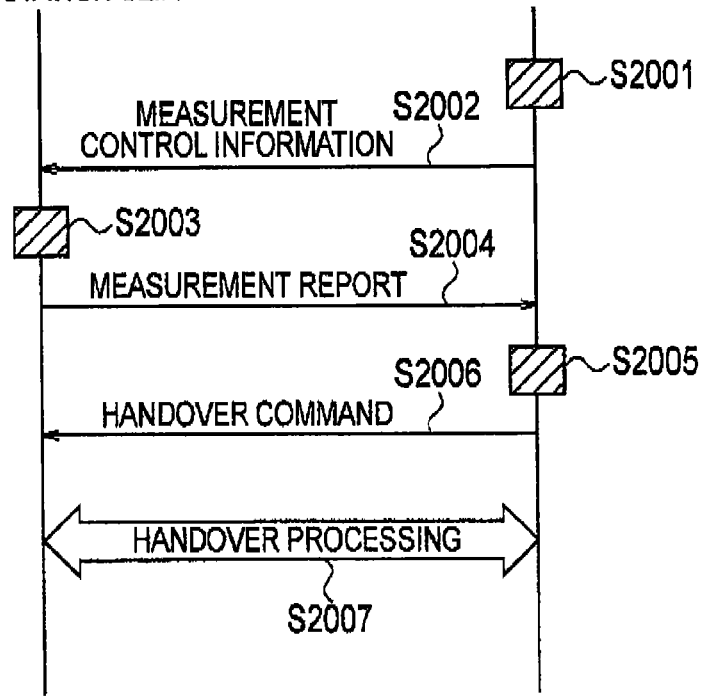
FIG. 9 is a sequence diagram showing an operation of the mobile communication system according to the modification example of the present invention.

As shown in FIG. 9, in Step S2001, once being installed, the femtocell radio base station #a2 detects a frequency used in a neighboring macro cell, determines the frequency f2 to be used in the femtocell #a2, and sets the pilot cells #a1 and #a3.

In Step S2002, the femtocell radio base station #a2 transmits measurement control information to the mobile station UE #1 that is to start communications in a macro cell #A1 or to the mobile station UE #1 that is communicating in the macro cell #A1, the measurement control information instructing the mobile station UE #1 to set the pilot cells #a1 and #a3 as measurement targets.

In Step S2003, the mobile station UE #1 measures the communication qualities (reception power of the guiding broadcast information, and the like) of the pilot cells #a1 and #a3. In Step S2004, the mobile station UE #1 transmits the measurement report including the measurement result to the femtocell radio base station #a2.

In Step S2005, the femtocell radio base station #a2 determines that the mobile station UE #1 should perform a handover to the femtocell #a2 associated with the pilot cell #a1. In Step S2006, the network apparatus 10 transmits to the mobile station UE #1 the handover command instructing the mobile station UE #1 to perform the handover.

In Step S2007, the mobile station UE #1 performs the handover to the femtocell #a2.

Second Modification

A mobile communication system according to a second modification of the present invention is described with reference to FIG. 10. The mobile communication system according to the second modification of the present invention is described below while focusing on the differences from the above described mobile communication system according to the first embodiment.

Figure 10:
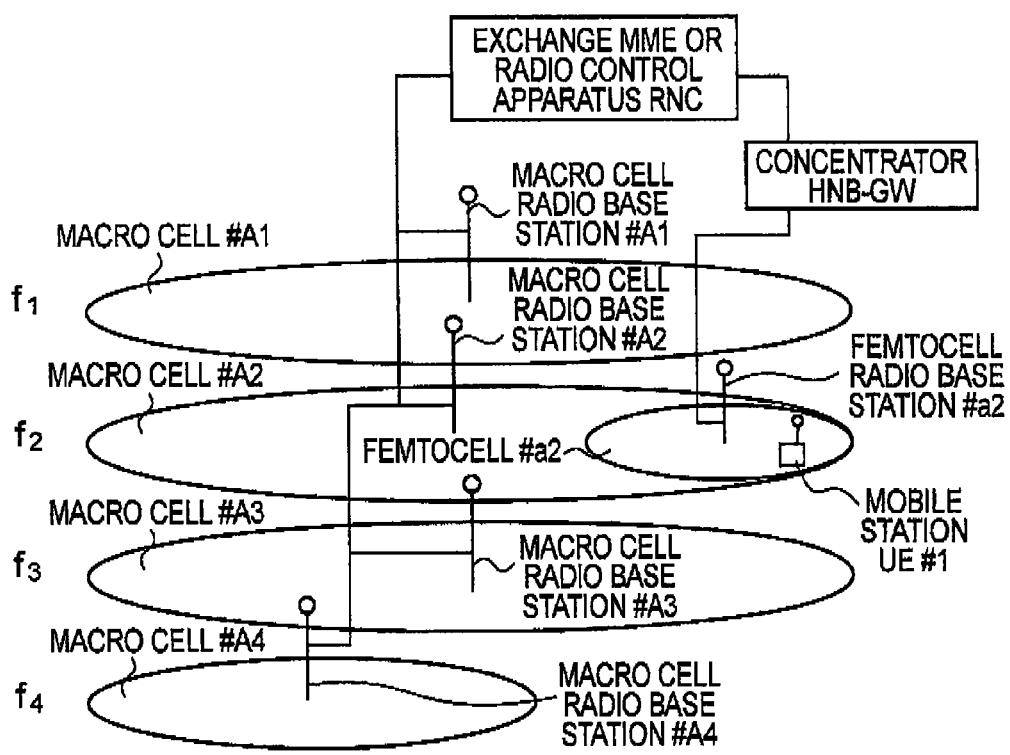
FIG. 10 is an overall configuration diagram of a mobile communication system according to a second modification of the present invention.

As shown in FIG. 10, the mobile communication system according to the second modification of the present invention may be a mobile communication system of the W-CDMA scheme or a mobile communication system of the LTE scheme.

In the mobile communication system according to the second modification of the present invention, macro cell radio base stations #A1 to #A4 are connected to an exchange MME or a radio control apparatus RNC. A femtocell radio base station #a2 is connected to a concentrator HNB-GW and to the exchange MME or the radio control apparatus RNC.

If the mobile communication system according to the second modification of the present invention is a mobile communication system of the W-CDMA scheme, the functions of the above described network apparatus 10 are installed in at least one of a radio base station NodeB, the radio control apparatus RNC, and the concentrator HNB-GW. In other words, in the mobile communication system according to the second modification, at least one of the radio base station NodeB, the radio control apparatus RNC, and the concentrator HNB-GW is configured to serve as the above described network apparatus 10.

Meanwhile, if the mobile communication system according to the second modification of the present invention is a mobile communication system of the LTE scheme, the functions of the above described network apparatus 10 are installed in at least one of an exchange MME, a radio base station eNB, and the concentrator HNB-GW. In other words, in the mobile communication system according to the second modification, at least one of the exchange MME, the radio base station eNB, and the concentrator HNB-GW is configured to serve as the above described network apparatus 10.

Third Modification

In this third modification, with the femtocell radio base station configured as in the first or second modification installed, regulatory information such as an "Access Class Barred LIST" may be used as the guiding broadcast information.

In such a case, if a mobile station UE which is in a state involving no handover by network control such as in an Idle state or in a common CH communication state detects a pilot cell, and then detects regulatory information on the pilot cell, the mobile station UE can be expected to transit to a femtocell through cell reselection processing.

Fourth Modification

In this fourth modification, the configuration may be such that, for example, a pilot cell and a femtocell are installed to use the same frequency if a mobile station UE is desired to operate as in the third modification.

In such a case, the transition of the mobile station UE to the femtocell with the cell reselection processing can be expected as in the third modification by setting the pilot cell larger than the femtocell so that a mobile station UE detects the pilot cell before detecting the femtocell.

Note that operation of the above described femtocell ration base station #a or the network apparatus 10 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the femtocell radio base station #a and the network apparatus 10. Also, the storage medium and the processor may be provided in the femtocell radio base station #a and the network apparatus 10 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method in a mobile communication system in which a macro cell where first broadcast information is transmitted using a first frequency geographically overlaps at least partially with a femtocell where second broadcast information is transmitted using a second frequency, the method comprising:
   step A of, based on a setting according to the first broadcast information, transmitting guiding broadcast information guiding the mobile station to the femtocell by the femtocell radio base station using the first frequency in a pilot cell that geographically overlaps with the femtocell;
   step B of performing a handover or cell reselection to the femtocell by a mobile station communicating in the macro cell, when the mobile station detects the guiding broadcast information; and
   step C of determining, by the femtocell radio base station, to transmit the second broadcast information in the femtocell by using the second frequency on the basis of broadcast information transmitted in a neighboring cell.

2. The mobile communication method according to claim 1, wherein the step B includes:
   step B1 of transmitting, by the mobile station, a measurement report including reception power of the guiding broadcast information;
   step B2 of transmitting a handover command to the mobile station in accordance with the measurement report, the handover command instructing the mobile station to perform the handover or cell reselection to the femtocell; and
   step B3 of performing the handover or cell reselection to the femtocell by the mobile station in accordance with the handover command.

3. The mobile communication method according to claim 2, wherein, in the step B2, the handover command instructing the mobile station to perform the handover or cell reselection to the femtocell is transmitted to the mobile station when the mobile station is determined to be permitted to access the femtocell on the basis of the measurement report.

4. A femtocell radio base station managing a femtocell in a mobile communication system in which a macro cell where first broadcast information is transmitted using a first frequency geographically overlaps at least partially with the femtocell where second broadcast information is transmitted using a second frequency, the femtocell radio base station comprising:
   circuitry configured to
      based on a setting according to the first broadcast information, transmit guiding broadcast information guiding a mobile station to perform a handover or cell reselection to the femtocell by using the first frequency in a pilot cell geographically overlapping with the femtocell; and
      determine, on the basis of broadcast information transmitted in a neighboring cell, to transmit the second broadcast information in the femtocell by using the second frequency.

5. The femtocell radio base station according to claim 4, wherein the circuitry is configured to transmit, to the mobile station communicating in the macro cell, a handover command instructing the mobile station to perform the handover or cell reselection to the femtocell when a measurement report transmitted from the mobile station includes reception power of the guiding broadcast information.

6. The femtocell radio base station according to claim 5, wherein the circuitry is configured to transmit, to the mobile station, the handover command instructing the mobile station to perform the handover or cell reselection to the femtocell in a case where the measurement report includes the reception power of the guiding broadcast information and where the mobile station is determined to be permitted to access the femtocell.

* * * * *